R. Caldwell,
Riding Saddle.
N°. 4,061.    Patented May 24, 1845.
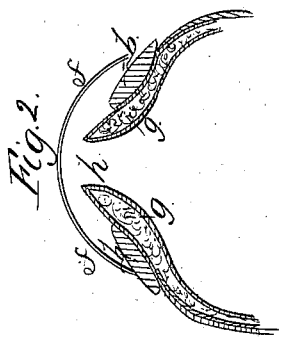
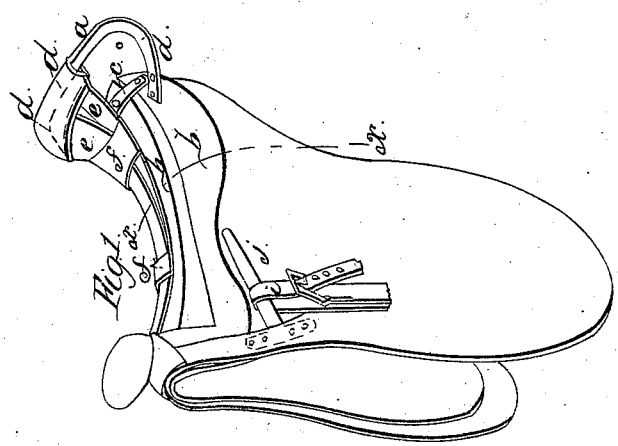

UNITED STATES PATENT OFFICE.

ROBERT CALDWELL, OF MONTEVALLO, ALABAMA.

SPRING-SADDLE.

Specification of Letters Patent No. 4,061, dated May 24, 1845.

*To all whom it may concern:*

Be it known that I, ROBERT CALDWELL, of Montevallo, in the county of Shelby and State of Alabama, have invented certain new and useful Improvements in the Manner of Constructing Riding-Saddles; and I do hereby declare that the following is a full and exact description thereof.

The tree of my improved saddle may be made of wood, the side bars and pommel being formed in the usual manner, but I dispense entirely with the use of wood in the cantle, using instead thereof a bar of spring steel which is bent into the form of the outer edge of a cantle, and is attached by screws, or rivets, to the side bars. This spring bar may be made round, or flat, but I prefer to form it of a strip of steel of about an inch in width, and three sixteenths of an inch in thickness. The straining webs may, at their rear ends, be attached directly to the spring bar, or to a covering of leather embracing this bar, and at their fore ends to the pommel. Over these, cross girths are to extend from side to side of the tree; this constitutes my first improvement; another consists in causing the straps by which the stirrups are suspended to hang upon hooked staples attached to the tree, so formed as that should the rider be thrown he cannot possibly hang by the stirrup, as this and the strap will be immediately disengaged from the saddle.

I do not use any cross straining of canvas, or other material, extending across from one side bar to the other, but between these bars there is a void space, as in the tree before it is covered. This serves to admit air freely to the back of the horse. The pad on the inside of the saddle I form in two parts, which I attach to the respective side bars in such manner as to leave the air space, above named, open; for the pad I use water proof leather, which I stuff with cut straw; by this means the pads are prevented from becoming hard, as the leather does not absorb the sweat, and the stuffing of cut straw does not consolidate, like the stuffing ordinarily used.

In the accompanying drawing, Figure 1, is a perspective view of my saddle, the seat leather being removed, and the girthing of the spring seat omitted on one side. Fig. 2, is a cross section of the saddle, in the line $x$, $x$, of Fig. 1.

The spring cantle bar is seen at $a$, $a$, attached by rivets to the side bar $b$; $c$, is a brace piece of iron to connect the two sides at their rear end.

One half of the spring cantle bar is shown as covered with leather, at $d$, $d$; and to this is attached the straining girths, $e$, $e$; across which pass the girths, $f$, $f$, represented as divided in the middle.

The pads are shown at $g$, $g$, Fig. 2, and the space between them at $h$.

One of the stirrup straps is seen at $i$, passing around a rod, or staple, $j$, which is attached, at its fore end to the saddle tree, but stands free from it at its rear end, allowing the strap to slide off freely when drawn back.

Having thus fully described the manner in which I construct my improved saddle, what I claim therein as new, and desire to secure by Letters Patent, is—

1. The converting the same into a spring saddle by means of a spring bar of steel, bent into the form of the outer edge of a cantle, so that the straining girths may extend therefrom to the pommel, thereby giving elasticity to the seat as set forth.

2. I likewise claim the manner of combining the stirrups with the saddle by allowing the stirrup straps to pass over staples, or rods, which are free from the saddle at the rear ends; by which device the stirrups will be detached from the saddle in case of their being drawn back by the falling of the rider, or otherwise; I do not claim the forming of such staples, or rods, as new in the abstract, but limit my claim to their employment as a means of connecting the stirrups with the saddle, by which an important improvement is effected.

ROBT. CALDWELL.

Witnesses:
THOS. P. JONES,
DANL. S. STAFFORD.